FIG.6
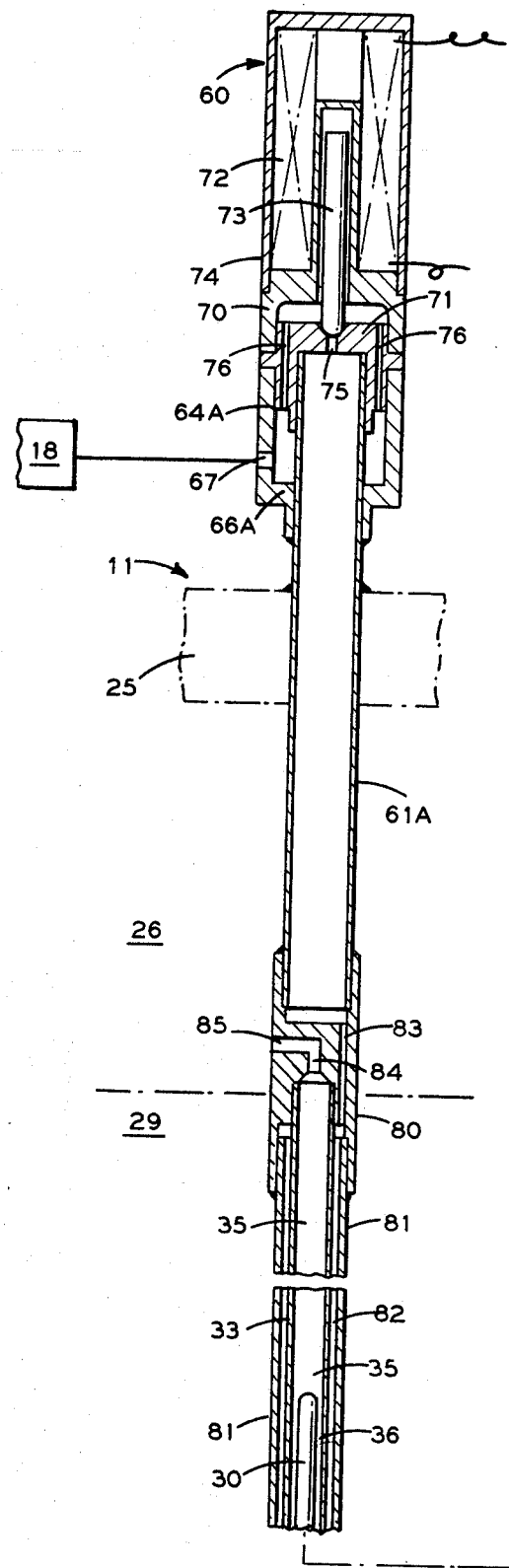
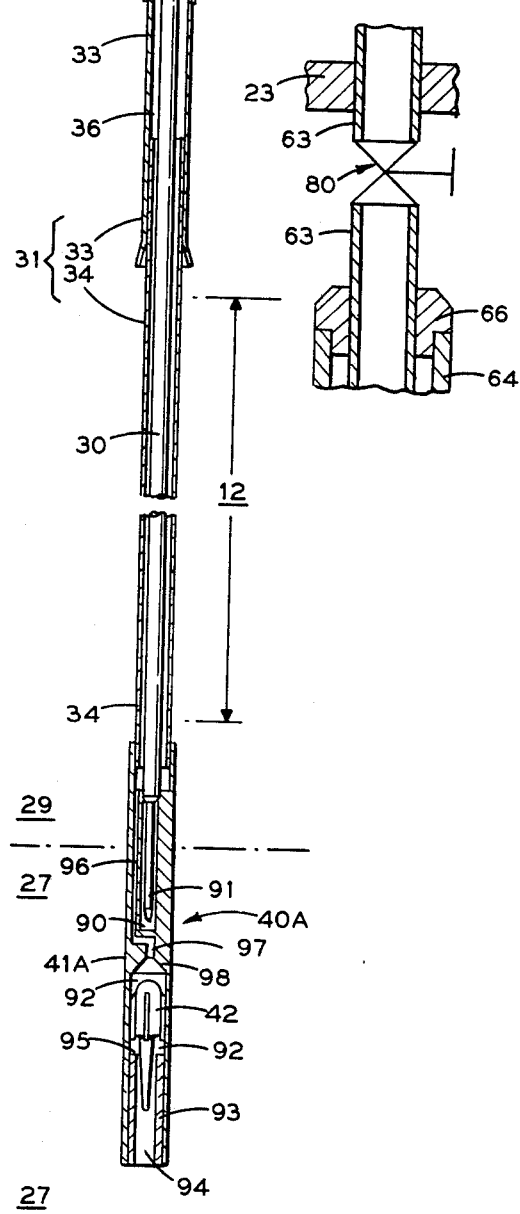

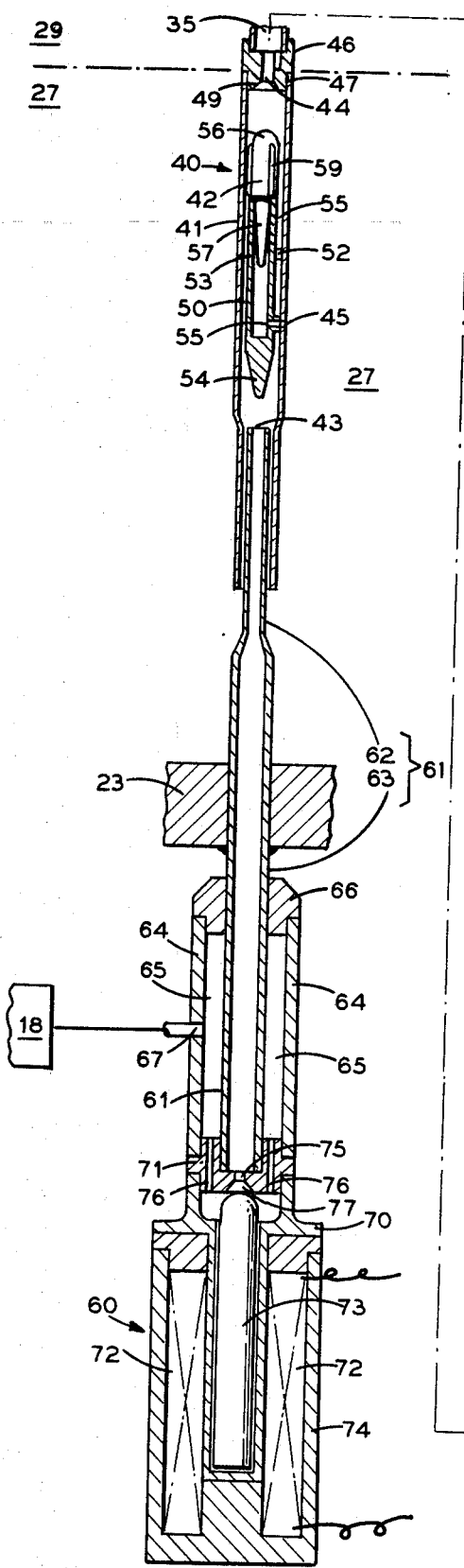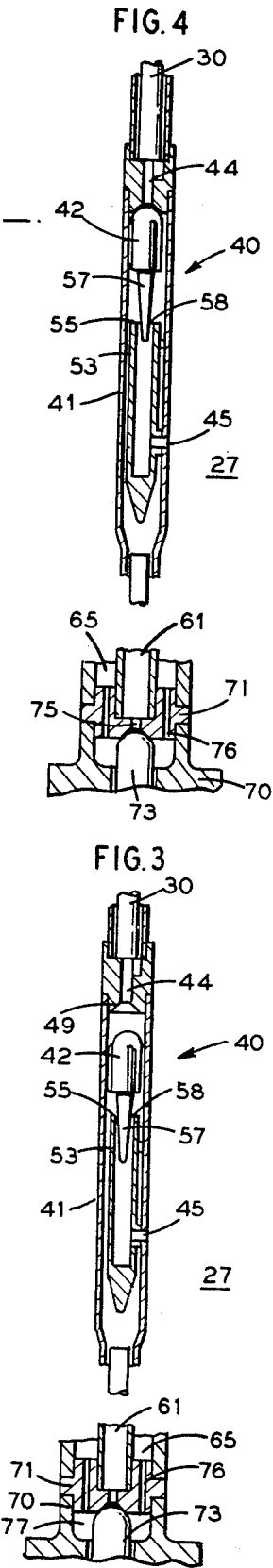

United States Patent Office

3,533,912
Patented Oct. 13, 1970

3,533,912
CONTROL ROD ACTUATING ARRANGEMENT
John D. Dempsey, Lynchburg, Va., assignor to The Babcock & Wilcox Company, New York, N.Y., a corporation of New Jersey
Filed Nov. 30, 1967, Ser. No. 686,883
Int. Cl. G21c 7/16
U.S. Cl. 176—36        11 Claims

ABSTRACT OF THE DISCLOSURE

A control rod associated with the core of a nuclear reactor is movably mounted in a passageway extending into the core so that it can be hydraulically moved out of the core under the influence of primary coolant flow through the passageway. The flow of primary coolant is controlled by a valve assembly mounted within the reactor. The valve assembly incorporates a valve which responds to different primary coolant pressures within the reactor, and also responds to a flow of primary coolant which can be introduced into the reactor from an external source for moving the control rod in the passageway.

BACKGROUND AND SUMMARY OF THE INVENTION

The core of a nuclear reactor is ordinarily composed of fissionable material bearing nuclear fuel rods with associated structural members for supporting the fuel rods within the reactor and may also include a solid moderating material for slowing down neutrons so that they possess the desired energy spectrum. To control the reaction rate of the fissionable material, passageways are provided in the core and the control rods movably mounted within the passageways for motion in and out of the core.

This invention relates to a method and apparatus for hydraulically actuating the control rods of a nuclear reactor. In practice, control rods are used to perform three different functions, i.e., to facilitate making large changes in power output levels to meet operating demands, to provide for fine adjustment in the power output level to compensate for drift; and to render the reactor subcritical as rapidly as possible in the event of a malfunction. Different control rods are usually used to perform the separate functions. However, the term "control rod" as used in this application is generic to scram rods, shim rods, regulating rods, power control rods and the like, and may also include fuel rods or rod-like forms of moderating material when used as control rods without departing from the spirit and scope of the invention. Since the inventive system is particularly adaptable to controlling scram rods, in order to simplify the descriptive material an arrangement for hydraulically actuating a pin-type scram rod is described.

The scram-type control rod is formed at least partially of a material having a large neutron absorption cross-section. The core is held below the level of criticality by full insertion of the rods into the core and made reactive to a desired degree by partial or complete withdrawal of the rods. A multiplicity of scram rods, or poison pins, are usually provided to perform the function of bringing the reactor to a subcritical state as rapidly as possible. Upon detection of a malfunction the rods are rapidly inserted into the core, without accurately positioning them to adjust the power output of the reactor to an intermediate level, since under these conditions the prime considerations are reliability and a rapid shutdown. When the reactor is producing power, some of the scram rods may be fully inserted in the core and others fully extracted to even out the flux density, thus controlling hot spots within the reactor and promoting more uniform consumption of the nuclear fuel throughout the reactor core.

Prior art systems for controlling scram rods included mechanical, pneumatic and hydraulic driving arrangements. It is well known in the art that mechanical drives tend to respond slowly and thus better suited for incrementally positioning rather than scramming the control rods, whereas fluid systems tend to be faster and are thus more adaptable to scram control. It is also known that a mechanical drive system is generally more reliable than a fluid drive system. As a result fluid drive systems are not in general use for controlling scram rods even though the faster scram speeds obtainable with such drives are attractive.

To make the fluid drive more reliable, a piston is usually connected to the control rod, the piston being disposed outside the reactor and actuated by hydraulic means. The precision sliding fits required in this arrangement renders the piston subject to galling and possible seizure. Moreover, the control rod is scrammed relatively slowly due to friction between the piston and its associated cylinder. The prior art has cured the latter problem by adding elaborate fluid circuitry to obtain high scram speeds, and then supplemented this circuitry with a rod release mechanism as an added safety precaution.

As fluid drive components have multiplied, the number of potential sources of failure have increased. For example, a control rod malfunction could cause a piston to be accidentally driven out of the core and/or a release mechanism could fail. The problems are compounded by the practical need to prevent the control rods from being withdrawn from the core if the reactor experiences a temporary pressure loss.

This application describes a reliable, fail-safe, fast, simplified hydraulic system for positioning control rods relative to the core, and is more particularly directed to a simplified reliable fail-safe positively acting hydraulic control system for preventing control rods from being withdrawn from the reactor core when it is desirable that they remain in the core. The invention is especially adaptable to curing in advance the potential problem of losing control of the reactor in the event that it experiences a temporary pressure loss which would tend to drive the control rods out of the core and allow the rate of reaction to increase without control.

BRIEF DESCRIPTION OF THE DRAWINGS

FIG. 2 is an enlarged sectional elevation of an embodiment of the inventive arrangement showing the float valve closed downwardly;

FIG. 3 is a partial sectional elevation similar to FIG. 2 showing the float valve disposed in an intermediate position;

FIG. 4 is a partial sectional elevation similar to FIG. 2 showing the float valve closed upwardly;

FIG. 5 is a partial sectional elevation view showing how FIGS. 2, 3 and 4 may be modified to include a cut off valve; and FIG. 6 is an enlarged sectional elevation of another embodiment of the inventive arrangement.

DESCRIPTION OF THE PREFERRED EMBODIMENTS

Figure 1:
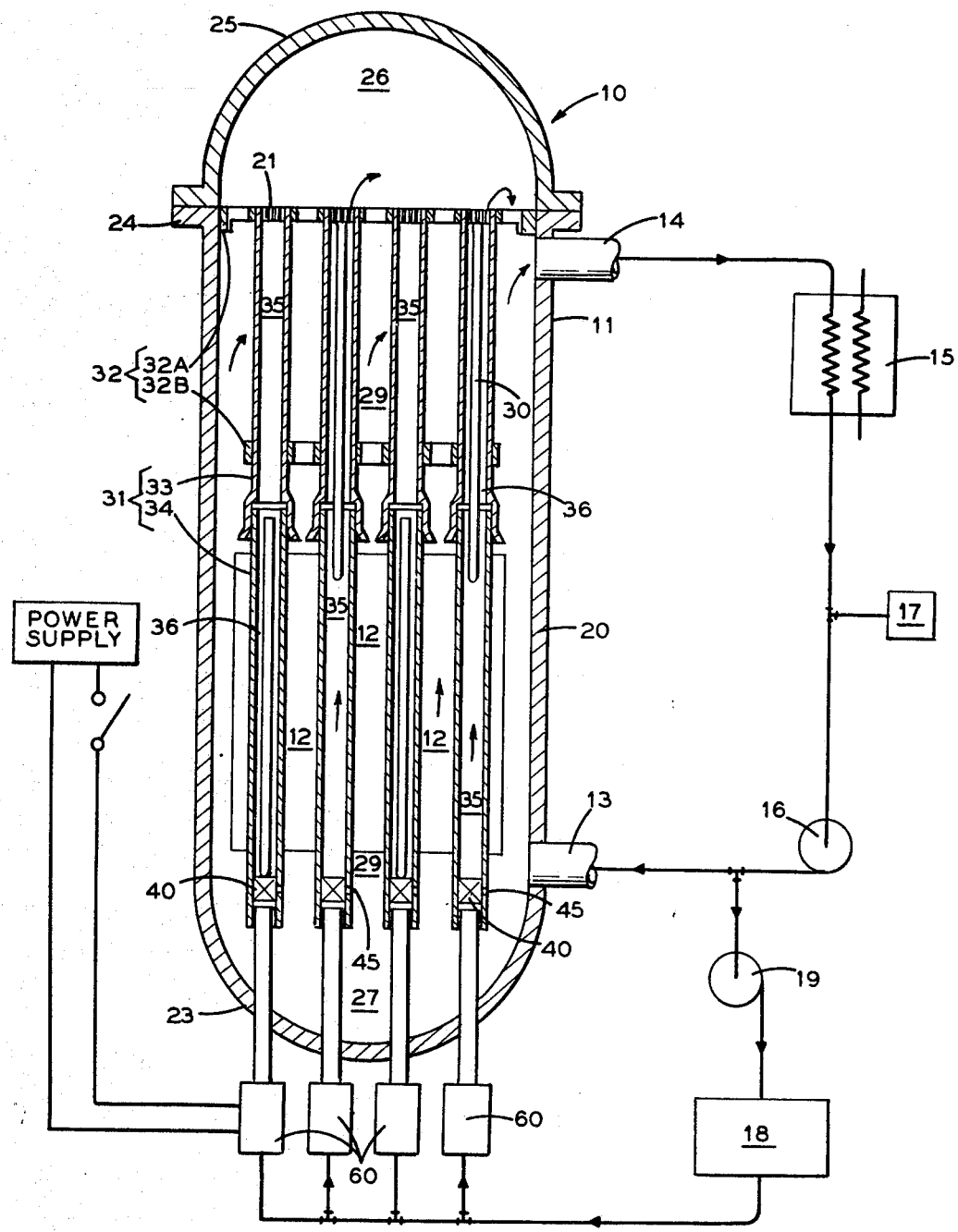
FIG. 1 is a schematic of a typical reactor incorporating the inventive arrangement.

Referring now to the drawings wherein like reference numerals designate like or corresponding parts throughout the several views there is shown in FIG. 1 a nuclear reactor 10 in fluid flow communication with a heat exchanger 15. The reactor 10 generally comprises a pressure vessel 11 within which there is disposed a plurality of nuclear fuel elements, moderating material as necessary and associated structure well known in the art for forming a fluid permeable reactor core 12. The vessel 11 is provided with an inlet 13 and outlet 14 for connection to the heat exchanger by means well known in the art. A circulating pump 16 in fluid flow communication with the heat exchanger 15 and pressure vessel 11 is provided to continuously circulate primary coolant into the vessel inlet 13, through the core 12, out of the vessel outlet 14, through the exchanger 15, and back to the vessel inlet 13. Useful energy in the form of heat generated by the fission process within the core is transferred to the coolant as it passes through the vessel 11, and extracted from the coolant on passing through the exchanger 15. A source of primary coolant 17, connected in fluid flow communication with the exchanger 15 and/or pump 16, may also be provided to make up for losses in primary coolant.

The pressure vessel 11 includes an upright cylindrically-shaped container 20 having an open upper end 21 and closed lower end 23. The upper end 21 is terminated by a flange 24 upon which there is removably mounted a generally hemispherically-shaped head 25 which defines an upper chamber 26, or plenum, in fluid flow communication with the outlet 14. The lower end 23 is also a substantially hemispherically-shaped closure which generally defines a lower chamber 27, or plenum, in fluid flow communication with the inlet 13. For the sake of simplicity, the general area intermediate the upper and lower chambers 26, 27 will hereinafter be referred to as the intermediate chamber 29. The core 12 is mounted in the intermediate chamber 29 so that it is disposed in the path of primary coolant flow from inlet to outlet. Typically, the primary coolant pressure level is in the range of from approximately 125 to 175 lbs./sq. in. within the inlet 13 and lower chamber 27, and is approximately 100 lbs./sq. in. within the outlet 14 and upper chamber 26. It is seen that the primary fluid experiences a pressure drop on passage through the intermediate chamber 29 and particularly the core 12, the pressure drop from lower chamber 27 to upper chamber 26 being typically in the range of from 25 to 75 lbs./sq. in.

The fission process is controlled by a plurality of control rods 30 which are elongated members of substantially circular cross-section endwise hydraulically movable in and out of the core. The control rods 30 are of high neutron absorption cross-section for capturing neutrons to limit the reactivity of the nuclear chain reaction. Since the rods absorb neutrons, when they are disposed downwardly within the core the number of neutrons available for the fission process is reduced and the power output level of the reactor is thus correspondingly reduced. On the other hand, when one or more of the rods is raised upwardly out of the core the number of neutrons available for entry into the fission process is increased and the power output correspondingly increased.

A hydraulic control system of the type hereinafter described may be used to control the position of the rods; by selectively raising and/or lowering one or more control rods from a position corresponding to full insertion within the core to one corresponding to full extraction from the core; by cyclically moving the rods between the two positions to control the power output of the reactor; and by positively preventing the rods from abortively rising out of the core when it is desirable to hold them downwardly within the core. The arrangement is particularly noteworthy in that it provides a method and apparatus for holding the rod or rods downwardly within the core in the event the reaction experiences an abnormal or accidental pressure loss which would tend to drive the rods upwardly out of the core. The hydraulic system thus incorporates a fail-safe feature in that it prevents an increase in thermal energy due to fission when the reactor experiences a failure condition evidenced by loss of primary coolant pressure in the outlet plenum 26.

The control rods travel in upright elongated annular guide members 31 supported within the reactor by a series of grids 32 which are spaced apart from one another and disposed in planes substantially transverse to the longitudinal axis of the members. Each guide member 31 includes an upper guide tube 33 and a lower guide tube 34. The grids 32 may be connected to the inner wall of the vessel or form a part of a removably mounted reactor component, such as a fuel element, without departing from the spirit and scope of the invention. For the purpose of as placing the inventive arrangement in a realistic setting, a typical supporting grid scheme is shown in FIG. 1 wherein the lower guide tubes 34 are shown supported in place by the core 12, the upper guide tubes 33 are carried by an upper grid 32A connected to the container 20, and an intermediate grid 32B transversely supports the upper guide tubes 33 to provide rigidity for the guide tube array.

The longitudinal length of each guide member 31 is approximately twice the length of the control rod for which it acts as a guide, and includes an upper guide tube 33 and lower guide tube 34. The upper end of each of the guide members 31 is open to the upper chamber 26 of the vessel via the upper guide tube 33 portion of the member 31. The upper 33 and lower 34 guide tube portions of a given member 31 are arranged in axial alignment with one another to form an elongated passageway 35. The passageway 35 is somewhat greater in cross-section than the control rod associated therewith so that an annular flow space 36 is thus continuously defined between any given rod and its corresponding guide member as the rod moves longitudinally of the length of the guide member. Because of this feature, the rods 30 act as floating pistons. They are drawn upwardly within their guide tubes 33, 34 by the forces developed as primary coolant passes upwardly through the annular flow spaces 36. Assuming the rate of coolant flow past a given control rod is not sufficient to raise and/or hold a rod upwardly within its guide member 31, the force of gravity will cause the rod to move downwardly within the tube. During downward movement, the control rods displace large volumes of coolant, through the annular flow spaces 36. Since the rods fit loosely within the guide tubes 33, 34 they are not subject to galling and possible seizure. Additionally, since the force of gravity is utilized to move the rods downwardly a pressurized driving source is eliminated and a more simplified trouble free hydraulic system realized.

Primary coolant flow within a given guide member 31 is controlled by an arrangement generally including a hydraulically controlled valve assembly 40 physically associated with the lower guide tube portion 34 of the guide member 31. One side of the valve assembly 40 is in controlled fluid flow communication with the primary coolant within the reactor 10 via a guide member 31 and the other side is in fluid flow communication via an electromagnetically operable valve assembly 60 to an accumulator 18 which acts as a source of high pressure primary coolant. The accumulator 18 is fed by a pump 19 connected to the primary coolant circuit to bypass a portion of the primary coolant from the circuit to the pump 19, from which it is discharged into the accumulator 18 at a higher pressure. It is a feature of the invention to provide an accumulator 18 to receive and store pressurized coolant and deliver the same to the electromagnetically operable valve assembly 60 at a more constant pressure than might otherwise be obtained by connecting the pump 19 directly to the valve assembly 60. However, making a direct connection between the primary coolant circuit and valve 60 via a pump 19 is within the spirit and scope of the invention.

Under normal operation conditions high pressure coolant for withdrawing the control rod 30 from the core 12, and holding the rod so withdrawn, flows from the accumulator 18 through the electromagnetically operable valve assembly 60, through the hydraulically controlled valve assembly 40 and guide member passageway 35 and into the upper chamber 26 of the vessel when the electromagnetically operable valve 60 is in the open mode of operation. On the other hand, when the valve assembly 60 is in the closed mode of operation the control rod 30 is normally inserted within the core 12 and held in place therein under the influence of gravity. When the control rod is inserted within the core, the hydraulically controlled valve assembly 40 opens the guide member passageway 35 to the lower plenum 27 via a control port 45 to allow a sufficient flow of primary coolant from within the reactor 10 to enter the guide member and bathe the control rod. As will hereinafter be more fully explained, the hydraulically controlled valve 40 responds to an abnormal pressure drop across the core by closing the lower end of the guide member passageway 35 to the ingress of control fluid from the lower plenum 27 and/or accumulator 18, thus preventing the control rod 30 from being withdrawn from the core 12.

In the preferred embodiment shown in FIGS. 2, 3 and 4 one hydraulically controlled valve assembly 40 is removably connected to the bottom of each of the lower guide tubes 34. The valve assembly 40 generally includes an elongated annular valve body 41 within which a valve 42 is hydraulically movable along the longitudinal axis thereof. The valve body 41 has inlet, outlet and control ports, or passageways 43, 44 and 45 respectively, through which primary coolant flows to regulate the position of the control rod within the guide member.

One end 46 of the valve body 41 is fitted with an end element 47 shaped like a plug axially bored to form the outlet port 44 for bringing the guide member passageway 35 into fluid flow communication with the interior of the valve body 41, and the other end 48 is partially necked inwardly to form the inlet port 43 for entry of pressurized primary coolant from the accumulator 18 via the electromagnetically controlled valve 60. The control port 45 is a short conduit extending inwardly from an opening in the valve body. Preferably, a plurality of control ports 45 formed substantially transverse to the longitudinal axis of the valve body 41 are provided to bring the interior of the valve body 41 into fluid flow communication with the lower plenum 27.

The end element 47 is counterbored from the outer end to receive the lower end of the lower guide tube 34 to which it is removably sealed by means well known in the art. The inner end of the end element 47 is provided with a beveled annular valve seating surface 49 formed coaxially with the outlet port 44 so that the valve 42, which is endwise movable substantially axially of the valve body 41, may be readily seated against the surface 49 to close the outlet port 44.

A hollow substantially cylindrically-shaped component 50 of lesser longitudinal length than the valve body 41 is coaxially mounted within the valve body and spaced apart therefrom to form an elongated annular channel 51 between the valve body 41 and cylindrical component 50 through which primary fluid may flow from the inlet port 43 to outlet port 44. A plurality of spacers 52 extend between the interior of the valve body and exterior of the component 50, axially align the component within the valve body. The component 50 has an open upper end 53 oriented so that opening is disposed opposite the outlet port 44 and a streamlined tapered closed end 54 aligned opposite the inlet port 43. The component 50 has an opening 55 formed therein, which is preferably a plurality of openings 55 in registry with and corresponding in number to the control ports 45. Each of the openings 55 is formed coextensively with one end of one of the control port conduits hereinbefore described which extend from the outer periphery of the valve body to the inner periphery of the component. As shown in FIG. 4, primary coolant may flow from the lower plenum 27 into the component 50 through the control ports 45 and out through opening in the upper end 53 of the component 50.

The valve 42 is freely floatable at a predetermined level between the open upper end 53 of the component 50 and outlet port 44, and movable therebetween. As shown in the drawings the valve 42 is not connected to the control rod 30. The valve 42 as a rounded end 56 seatable against the valve seat 49 and a tapered end 57 which protrudes at least partially through opening in the upper end 53 of the component 50 and thereinto. The open upper end 53 of the component 50 acts as a seat for the valve 42, the valve being hydraulically seated against the component, as shown in FIG. 2, to close the open end 53 when pressurized coolant from the accumulator 18 flows from the inlet port 43 through the outlet port 44 and into the guide member passageway 35, the flow of fluid withdrawing and holding the control rod out of the core. Under normal operating conditions, absent such fluid flow the control rods would be inserted within the core and held therein by force of gravity. In the latter event, the difference in primary coolant pressure between the lower plenum 27 and upper plenum 26 causes primary coolant to flow from the lower plenum 27 at a rate sufficient to unseat the valve 42 from the open upper end 53 of the component 50 and lift it toward the outlet port 44 as shown in FIG. 3, but not great enough to seat the valve 42 against the valve seat 49 to thereby close the outlet port 44 as shown in FIG. 4, and not great enough to raise the control rod. The valve 42 thus normally floats in an intermediate position between the valve seat 49 and the open upper end 53 of component 50 as shown in FIG. 3, when valve 60 is in the closed mode of operation. The primary coolant thus flows from the lower plenum 27, through the control port 45, into the interior of the component 50, through outlet port 44, into the passageway 35 and thence to the upper plenum 26, bathing and thus cooling the control rod in transit. The valve 42 is a self-positioning device. The portion of the valve 42 intermediate the rounded 56 and tapered 57 ends provided with a plurality of longitudinally extending fins 59 which promote axial motion of the valve within the valve body 41 and prevent the valve from rotating. As best shown in FIGS. 3 and 4 as fluid flows through the control port 45 and unseats the valve 42, the tapered trailing end 57 of the valve 42 is withdrawn from the interior of the component 50 to form therewith an annular orifice 58 at the open upper end 53 of the component. The orifice 58 increases as the valve 42 is withdrawn from the component and decreases as the valve is inserted, the change in size of the orifice being equal to that portion of the transverse cross section of the tapered end of the valve which has been removed from, or inserted into, the open upper end of the component. Since the weight of the valve 42 is constant, the valve floats at an intermediate position between the valve seat 49 and the open upper end 53 of the component 50, or is seated against the end element valve seat 49, depending on the rate of flow induced by the primary coolant pressure differential across the intermediate chamber 29.

As hereinbefore indicated, under normal operating conditions, assuming the control rod is inserted within the core, the control rod will be bathed with a greater or lesser flow of primary coolant, depending on the difference in pressure between the primary coolant in the upper plenum 26 and lower plenum 27, since the position in which the valve floats intermediate the valve seats 49, 53 is a function of this pressure differential. Assuming the valve 42 were omitted, if the primary coolant pressure within the upper plenum were to decrease sufficiently, the relatively higher lower plenum pressure could cause coolant to flow from the plenum 27 at a rate sufficient to withdraw the control rod from the core with the result that the rate of fission would increase. To avoid this possibility, the valve 42 is designed such that a predetermined flow rate will cause the valve 42 to seat against the end element valve seat 49 as shown in FIG. 4, thus closing the outlet port 44 to prevent the control rod from being withdrawn. The inner diameter of the component 50 as measured at the open end 53 thereof; the weight of the valve 42 and the effect angle the tapered outer surface of the valve describes with respect to the longitudinal axis of the valve thereof may be fixed to give the desired response described. In a given application these parameters may be fixed such that when the fluid flow through the orifice 58 is equal to or greater than approximately 1.4 gal./min. the valve 42 will seat against the end element valve seat 49, closing the outlet port 44.

In operation a malfunction in the primary coolant system is generally evidenced by an increase in pressure drop across the core, primary coolant pressure in the upper chamber 26 becoming abnormally less than the primary coolant pressure in the lower chamber or plenum 27. This pressure differential appears across the valve 42 since the upper end of the upper guide tube 33 is open to the upper plenum 26 and the valve control port 45 is open to the lower plenum 27. The operative dimensions of the valve 42 and component 50 may be fixed on the basis of knowing the flow rate through the guide member 31 which is sufficient to raise the control rod out of the core. Knowing the flow rate through a particularly dimensioned component 50 which corresponds to the giude member flow rate for raising the rod, affords a basis for dimensioning the valve 42 to ensure closure of the outlet port 44 so as to cut off flow through the guide member 31 at a predetermined pressure differential across the core.

Referring now to FIG. 2 it is seen that the valve assembly inlet port 43 is formed by partially necking the elongated annular valve body 41 inwardly, to adjust the structural configuration of the inlet end of the valve body for making a loose slip-fit connection between the inlet end of the valve body and a conduit 61 which extends externally of the pressure vessel for connection to a source of pressurized coolant via the electromagnetically operable valve assembly 60. It is a feature of the invention to provide a slip-fit connection so that when it becomes necessary in the course of general maintenance of the reactor to remove and/or reshuffle fuel rods and/or fuel elements, guide members 31 are removable with the fuel rods and/or fuel elements. The hydraulic valve assembly 40 carried by each guide member may be readily removed with the lower guide tube portion 34 of the guide member without having to break a sealed connection between the valve body 41 and conduit 61.

The slip joint arrangement in no way interferes with the operating characteristics of the hydraulically controlled valve 42. For example, assuming leakage through the slip joint could become great enough to raise the control rod; before the pressure drop across the intermediate chamber were sufficient to induce such leakage, fluid flow through the control port 45 would cause the valve 42 to close the guide member 31 as hereinbefore described thereby preventing the control rod from being raised. Further, when the electromagnetically operative valve assembly 60 is in the open mode of operation, pressurized coolant from the accumulator 18 which flows through the conduit 61 into the interior of the valve body 41 forcing the valve 42 downwardly on the open upper end 53 of the component 50 and closing the same, is at a greater pressure than the reactor coolant exteriorly of the valve body 41. Hence, normal slip joint leakage is at near zero level or fluid flows outwardly from the valve body through the slip joint.

As hereinbefore indicated the conduit 61 extends externally of the reactor. In the preferred arrangement, each hydraulic valve assembly 40 is connected in fluid flow communication with an electromagnetically controlled valve assembly 60 via an individual conduit 61 extending therebetween. The upper end 62 of each conduit 61 is structurally formed for being loosely slip-fitted to the outlet port of the valve assembly 40. The lower end 63 is formed so that the valve assembly 60 may be connected thereto. The lower end closure 23 of the pressure vessel 11 is pierced for passage of the conduit 61, the conduit being secured in place to the end closure by welding the exterior of the conduit to the external side of the end closure so that the conduit may be removed by breaking the weld, without entering the pressure vessel.

A length of tubing 64 is connected coaxially around a portion of the lower end of the conduit 61 to form therewith a coaxial vertically extending annular channel 65 between the exterior of the conduit and interior of the tube. The upper end of the tube 64 is spaced apart from the conduit 61, and the upper end of the annular channel 65 closed, by means of an annular cap 66 suitably sealed to the tube and conduit. The extreme lower ends of the tube 64 and conduit 61 act as a pedestal for mounting the electromagnetically controlled valve assembly 60. The tube 64 is provided with an opening 67 through which the annular channel 65 is connected in fluid flow communication with the source of high pressure primary coolant such as an accumulator 18.

The assembly 60 comprises a circular housing 70 of generally U-shaped longitudinal cross-section; a valve seating element 71 connected to the open upper end of the housing 70 for mounting the housing on the lower ends of the tube and conduit to form coolant flow path between the annular channel 65 and interior of the conduit 61; a removable solenoid coil 72 mounted concentric with, and externally around the longitudinal length of the housing 70 and adapted to be connected to a source of current; a movable ferromagnetic core 73 which acts as a valve for closing the aforesaid flow path between the conduit 61 and channel 65 upon deenergization of the coil 72 opens the same when the coil is energized; and a cover 74 removably mounted on the housing 70 for enclosing and protecting the coil 72.

The valve seating element 71 is centrally bored to form a passageway 75 between the interior of the conduit 61 and housing 70, and peripherally bored to form a plurality of passageways 76 between the interior of the housing 70 and annular channel 65. Hence, when the ferromagnetic core or valve 73 is in the open mode of operation as shown in FIG. 2, the aforesaid coolant flow path is formed between the conduit 61 and annular channel 65 via the bored passageways 75, 76 in the end element 71 and the interior of the housing 70. The seating element 71 is provided with a beveled seating surface 77 against which the magnetic valve 73 is seated to close off the flow path at the central passageway 75. The passageway 75 is closed off when the solenoid coil is deenergized despite the fact that a spring is not provided to return the magnetic valve 73 for closure. Numerous tests have shown that the valve spring is superfluous. When the coil 72 is deenergized, primary coolant initially flows unimpeded from the interior of the housing 70 through the central passageway 75 and into the conduit 61. However, this fluid flow substantially immediately draws the magnetic valve 73 upwardly and seats the valve 73 against the seating surface 77 closing off the central passageway 75. As the coolant flows between the valve seating surface 77 and the rounded upper end of the magnetic valve 73, a pressure differential builds up such that the pressure at top center of the magnetic valve is less than the pressure within the valve housing 70. The pressure differential thus developed causes the valve 73 to close as shown in FIGS. 3 and 4 when the solenoid coil 72 is deenergized, but is normally not great enough to close the valve 73 when the coil 72 is energized as shown in FIG. 2. The gap between the valve seating surface 77 and rounded upper end of the magnetic valve 73 is adjusted such that the pressure differential from top center of the valve 73 to the interior of the housing is sufficient to raise the valve 73 when the coil is deenergized, but not sufficient to overcome the electromagnetic force impressed on the valve 73 when the coil is energized. However, in the event a pressure loss occurs in the outlet plenum while the coil 72 is energized the increase in coolant flow rate occasioned by this abnormal or accidental pressure loss will overcome the holding force of the coil and raise the valve 73 to its closed position even though the coil is energized, whereupon the float valve 42 will close off flow in the guide member 31 as hereinbefore described. The magnetic valve 73 thus acts as a fail-safe device to close off the flow of high pressure primary coolant in the event an accidental pressure loss is sustained when the magnetic valve is in the open mode of operation. The valve seating element 71 is a long term replacement item and special provisions need not generally be made to replace or renew worn valve seats. However, to permit inspection of valve seat, another feature of the inventive arrangement is to include a cut-off valve 80 as shown in FIG. 5, the lower end 63 of the conduit 61 intermediate the lower end closure 23 of the pressure vessel and annular cap 66 to seal off the conduit to facilitate inspection and replacement of worn valve seating elements 71 or an entire valve assembly 60. When the valve 80 is closed the control rod associated with that particular conduit will necessarily fall downwardly within the core under the influence of gravity since high pressure coolant will no longer be available to raise and hold the rod out of the core. However, during the maintenance procedure, all of the other features of the inventive arrangement are operative, the reactor need not be shut down, opened or drained. Further, the vave 80 provided an added safety feature in that it permits cutting off the flow of high pressure primary coolant to a given control rod in the event a magnetic valve 73 should fail to close the passageway 75 when the coil is deenergized.

The embodiment hereinbefore described may be modified as shown in FIG. 6 when it is desirable to drive the control rod from above the reactor. The magnetically controlled valve assembly 60 may then be located above the reactor since it is in fluid flow communication with the upper guide tube 33 rather than the lower guide tube 34.

As shown in FIG. 6 the valve assembly 60 is of the same construction as the valve assembly of FIGS. 2–5 and is mounted on the end of a conduit and tube structure 61A, 64A similar to the structure, 61, 64 heretofore described. However, the conduit 61A extends through the head 25 of the pressure vessel 11 rather than the lower end closure 23 and is interconnected in fluid flow communication with the upper guide tube portion 33 of the guide member 31 rather than the lower portion 34.

The lower end of the conduit 61A is adapted to the upper guide tube 33 via an elongated transition fitting 80 of substantially circular cross section and a pressure tube 81. The pressure tube 81 is coaxially mounted around the upper guide tube 33 and spaced apart therefrom by an annular spacer 88 seal welded to the upper guide tube 33 and pressure tube 81 so as to form an elongated annulus 82 therebetween which extends upwardly from the lower end of the pressure tube 81. The transition fitting 80 is seal-welded to the upper end of the pressure tube 81 and lower end of the conduit 61A, and lengthwise bored to provide a coolant passageway 83 between the conduit 61A and annulus 82. The fitting 80 is also partially centrally bored from the end of the fitting 80 adjacent the upper guide tube 33 to form a central passageway 84, and radially bored from the outer surface of the fitting 80 to form a transverse passageway 85 which intersects the central passageway 84. Together, the passageways 84 and 85 form an elbow-shaped coolant passageway between the interior of the upper guide tube and the upper plenum 26 of the pressure vessel 11. Preferably, a plurality of both passageways 83 and radially transverse passageways 85 which intersect a single central passageway 84, are provided such that passageways 83 and 85 are alternately disposed about the longitudinal axis of the fitting 80.

As in the embodiment first described, the elongated passageway 35 formed by the guide member 31 is of greater cross section than the control rod associated therewith, and an annular flow space 36 is defined between the control rod 30 and guide member 31. FIG. 6 shows the control rod 30 positioned downwardly within the core 12. A portion of the control rod extends above the lower guide tube portion 34 of the guide member 31 so that it projects into the upper guide tube portion 33. A plurality of openings 87 are formed through the upper guide tube just above the annular spacer 88 bringing the annulus 82 into fluid flow communication with the annular flow space 36 associated with the upper guide tube 33.

In operation, assuming the valve 60 is in the open mode of operation and valve 42 is closed as hereinafter described, pressurized coolant from the accumulator 18 will flow through the valve body opening 67, upwardly through the passageway 76 and into the interior of housing 70, thence through port 75 and into the conduit 61A, through the conduit 61A, through the passageway 83 and into the annulus 82, then through the orifices 87 and upwardly through the annular flow space 36, past the control rod, upwardly through the portion of the upper guide tube above the control rod, through the central passageway 84 and transverse passageway 85, and into the upper plenum 26 of the pressure vessel 11. The upwardly flowing coolant floats the control rod upwardly within the guide member 31, a low pressure area developing above the control rod as the coolant flows from the annular flow space 36 to the area above the control rod. Valve 42 was assumed closed. However, the valve 42 would normally be initially open when valve 60 is first opened and some of the coolant would initially flow downwardly as well as upwardly through the guide member 31. The downwardly flowing coolant passes through passageway 96 at the bottom of the lower guide tube 34 and into passageway 97, moving the valve 42 downwardly and seating the same against surface 95. The valve 42 thus closes off fluid communication between the lower plenum 27 and conduit 61A when valve 73 is in the open mode of operation.

Referring particularly to the hydraulically controlled valve assembly 40A of FIG. 6 it is seen that while the valve body 41A is of somewhat different construction than the valve body 41 described in the preferred embodiment, the float valve 42 retains the same form. The valve body 41A is of two port rather than 3 port construction and generally comprises an elongated annular member of substantially circular cross-section welded to the lower end of the lower guide tube 34. As in the embodiment first described, the valve body 41A extends substantially coaxially beneath the lower guide tube 34 and is disposed within the lower plenum 27 of the pressure vessel 11, beneath the core 12.

The upper portion of the valve body 41A has an elongated cavity 90 formed centrally thereof which extends downwardly from the end of the valve body 41A adjacent the lower guide tube. The control rod has a formed reduced lower end portion 91. The valve body 41A and rod end 91 cooperate with one another through the coolant medium to form a viscous damper for cushioning the fall of the control rod. The transverse cross-sectional dimension of the cavity and its longitudinal length are slightly greater than the corresponding dimensions of the rod end 91 so that the rod 30 seats against the upper end 99 of the valve body after the downward motion of the rod has been braked.

The lower portion of the valve body 41A has an elongated cavity 92 formed centrally thereof which extends upwardly from the end of the valve body remote from the lower guide tube. The finned float valve 42 is captured for endwise movement within the lower cavity 92 by an elongated annular sleeve 93 of shorter length than the cavity 92 and mounted therein. The sleeve 93 extends upwardly within the cavity from the lower end of the valve body 41A to define an inlet port 94 in fluid flow communication with the lower plenum 27 and provide a lower seating surface 95 for the float valve 42.

Intermediate the upper and lower portions the valve body 41A is of substantially solid cross-section except for a passageway 96 which acts as an outlet port extending from the lower guide tube 34 to the upper end of the lower cavity 92 to bring the guide tube and cavity 92 into fluid flow communication with one another. The lower end of the passageway 96 is a circularly shaped channel 97 bored substantially axially of the valve body which is terminally defined at its lower end by a beveled annular surface 98 formed coaxially with the boring to define an upper seating surface for the float valve 42.

In operation the float valve 42 is moved downwardly and seated against the lower seating surface 95 when the magnetic valve 73 is positioned in the open mode of operation. Under these circumstances high pressure primary coolant initially flows downwardly within the guide member 31, through the passageway 96 and into the cavity 92 to seat the valve 42 against the lower seating surface 95, closing off the inlet port 94 and thereafter flows upwardly as hereinbefore described to lift the control rod upwardly within the guide member 31. However, when the magnetic valve 73 is in the closed mode of operation coolant in the lower plenum 27 flows into the inlet port 94, through the valve body cavity 92 and outlet port or passageway 96, then through the guide member 31 and about the control rod, then through the elbow-shaped coolant passageway 84, 85 of the transition fitting 80 and into the upper plenum 26, bathing the control rod with coolant. Normally, the float seeks an intermediate position when the magnetic valve is in the closed mode of operation as shown in FIG. 6 since the difference in upper and lower plenum coolant pressures is sufficient to raise the float valve 42 but not sufficient to seat the same against the upper seating surface 98, and the control rod is therefore held downwardly within the core by force of gravity.

In the embodiment first described, the manner in which the float valve 42 acts as a self-positioning device was presented in detail. In the embodiment shown in FIG. 6 it is apparent that the inlet and outlet ports or passageways 94 and 96 respectively correspond to the control and outlet ports 45 and 44 described in the first embodiment, and the sleeve 93 functionally corresponds to the valve component 50. Hence, the detailed discussion set forth regarding the design and functional characteristics of valve 42 and component 50 of FIGS. 2–4 applies with equal force to valve 42 and sleeve 93 arrangement of FIG. 6. Further, when the reactor experiences an accidental pressure loss which would tend to drive the control rod upwardly within the guide member, the float valve 42 of FIG. 6 is seated upwardly against the upper seating surface 98 and the outlet passageway 96 is thus closed off to prevent the control rod from being raised upwardly within the guide member. As in the embodiment first described the magnetic valve is in the closed mode of operation when the solenoid coil 72 is deenergized and in the open mode when the coil is energized.

The inventive arrangements hereinbefore described and shown in FIGS. 1–6 have been descriptively limited to an individual rod. However, it should be appreciated that a single electromagnetically operable valve assembly may be placed in series fluid flow communication with a common junction header from which a plurality of hydraulically operable valve assemblies disposed in parallel fluid flow communication with one another extend, each to an individual guide tube, without departing from the spirit and scope of the invention. Thus, clusters of control rods may be operated, raised and lowered as a group, while at the same time each rod would be provided with its own separate float valve. Further, it should be appreciated that the second embodiment may be modified to eliminate the float valve and rely entirely on the fail-safe characteristic of the electromagnetically operable valve assembly for holding the control rod downwardly within the reactor core by, for example, disposing the transition fitting externally of the reactor and venting the guide member therethrough to a low pressure source of primary coolant. Under these circumstances primary coolant would flow through the guide member from the lower plenum to the external source of low pressure coolant for raising the rod whenever the magnetic valve was in the open mode of operation and the rod would be disposed downwardly within the core when the magnetic valve was in the deenergized closed mode. However, an abnormal flow through the valve body would close the magnetic valve downwardly even though the solenoid coil were energized with the result that the control rod would fall downwardly within the reactor under the influence of gravity.

What is claimed is:

1. A nuclear reactor generally comprising a pressure vessel having an inlet and an outlet, a core mounted within the pressure vessel intermediate the inlet and outlet, the vessel being adapted to have a primary coolant circulated through the core from the inlet to the outlet, guide means associated with the core and forming an elongated passageway which extends into the core, and a control rod movable within the passageway to control the reactivity of the core, wherein the improvement comprises the control rod being of lesser length than the passageway and of substantially smaller transverse cross-section than the passageway to form therewith an elongated annulus through which primary coolant can flow, a valve assembly mounted within the pressure vessel in primary coolant flow communication with the passageway for controlling the flow of coolant in the passageway, and actuating means externally of the pressure vessel for introducing coolant into the passageway at a pressure higher than that of the primary coolant to hydraulically move the control rod, and wherein the valve assembly comprises a valve body having a passage therein communicating with the passageway, an elongated valve unconnected to the control rod and endwise movable between two positions within the passage and freely floatable within the passage under the influence of primary coolant flow within the reactor to control the flow of primary coolant in the passageway.

2. The improvement according to claim 1 wherein the valve assembly further comprises an elongated annular element having an open end and mounted within the valve body passage, and the valve has an end which extends into the open end of the element, the valve cooperating with the actuating means for controlling the flow of primary coolant in the passageway.

3. The improvement according to claim 1 wherein the introduced coolant is primary coolant introduced into the passageway through the valve assembly by the actuating mean.

4. The improvement according to claim 1 wherein the valve assembly further comprises an elongated annular element having an open end and mounted within the valve body passage, and the valve has an end which extends into the open end of the element.

5. The improvement according to claim 1 wherein the valve assembly is carried by the guide means, the actuating means includes a conduit which extends into the pressure vessel, and the valve body is loosely slip-fit connected to the end of the conduit within the pressure vessel so that the valve assembly may be moved with the guide means.

6. A nuclear reactor generally comprising a pressure vessel having an inlet and an outlet, a core mounted within the pressure vessel intermediate the inlet and outlet, the vessel being adapted to have a primary coolant circulated through the core from the inlet to the outlet, guide means associated with the core and forming an elongated passageway which extends into the core, and a control rod movable within the passageway to control the reactivity of the core, wherein the improvement comprises the control rod being of lesser length than the passageway and of substantially smaller transverse cross-section than the passageway to form therewith an elongated annulus through which primary coolant can flow, a valve assembly mounted within the pressure vessel in primary coolant flow communication with the passageway for controlling the flow of coolant in the passageway, and actuating means externally of the pressure vessel for introducing a portion of the primary coolant into the passageway at a pressure higher than that of the primary coolant to hydraulically move the control rod, the introduced coolant is primary coolant, and wherein the actuating means comprises a source of primary coolant maintaining the introduced coolant at a pressure in excess of that of the primary coolant within the pressure vessel, means for conducting the high pressure coolant in a path from the source to the passageway, a solenoid coil having terminals adapted to be energized by a source of current, a feromagnetic core electromagnetically coupled with the coil which acts as a valve in the coolant path, and means for energizing and deenergizing the coil to actuate the ferromagnetic valve.

7. The improvement according to claim 3 wherein the valve body passage comprises a first passage in primary coolant flow communication with the passageway and actuating means and a second passage in primary coolant flow communication with the first passage and the interior of the pressure vessel, and the valve is contained in the valve body to normally close off coolant communication between the passages when the actuating means is actuated.

8. The improvement according to claim 7 wherein the valve assembly is constructed and arranged such that the valve normally floats within the valve body under the influence of coolant flowing from the interior of the pressure vessel through the second passage and into the passageway when the actuating means is not actuated.

9. The improvement according to claim 7 wherein the valve assembly is constructed and arranged such that the valve closes off coolant flow from the passages to the passageway when the primary coolant pressure differential across the core tends to drive the control rod out of the core due to an inadvertent pressure increase thereacross.

10. The improvement according to claim 7 wherein the valve is constructed and arranged such that it is movable under the influence of primary coolant between two positions within the valve body and floatable in a third position, the valve positioning itself in one of the three positions depending on primary coolant pressure differential endwise of the valve.

11. The improvement according to claim 7 wherein the control rod has an upper end, and the valve is constructed and arranged to close off communication between the passages and passageway even when the actuating means is actuated if the primary coolant pressure at the upper end of the control rod evidences that the outlet of the pressure vessel has been inadvertently depressurized.

References Cited

UNITED STATES PATENTS

| | | | |
|---|---|---|---|
| 3,257,286 | 6/1966 | Ryon et al. | 176—35 |
| 3,264,952 | 8/1966 | Winders | 176—36 |
| 3,347,747 | 10/1967 | West et al. | 176—35 |
| 3,384,549 | 5/1968 | DeLiege et al. | 176—36 |
| 3,390,052 | 6/1968 | McDaniels | 176—35 |

FOREIGN PATENTS

| | | |
|---|---|---|
| 612,009 | 1/1961 | Canada. |
| 1,445,879 | 6/1966 | France. |

CARL D. QUARFORTH, Primary Examiner

H. E. BEHREND, Assistant Examiner